United States Patent
Ushida et al.

(10) Patent No.: US 11,482,898 B2
(45) Date of Patent: Oct. 25, 2022

(54) ROTOR FOR ROTARY ELECTRIC MACHINE

(71) Applicant: AISIN CORPORATION, Kariya (JP)

(72) Inventors: Hideharu Ushida, Aichi (JP); Tetsuya Matsubara, Aichi (JP); Takeshi Yokoyama, Aichi (JP)

(73) Assignee: AISIN CORPORATION, Kariya (JP)

( * ) Notice: Subject to any disclaimer, the term of this patent is extended or adjusted under 35 U.S.C. 154(b) by 107 days.

(21) Appl. No.: 16/967,923

(22) PCT Filed: Mar. 19, 2019

(86) PCT No.: PCT/JP2019/011512
§ 371 (c)(1),
(2) Date: Aug. 6, 2020

(87) PCT Pub. No.: WO2019/181958
PCT Pub. Date: Sep. 26, 2019

(65) Prior Publication Data
US 2020/0373798 A1    Nov. 26, 2020

(30) Foreign Application Priority Data
Mar. 23, 2018  (JP) .............................. JP2018-055845

(51) Int. Cl.
*H02K 1/27* (2022.01)
*H02K 1/28* (2006.01)

(52) U.S. Cl.
CPC ................. *H02K 1/27* (2013.01); *H02K 1/28* (2013.01)

(58) Field of Classification Search
CPC .......... H02K 1/27; H02K 1/28; H02K 1/2766; H02K 1/30; H02K 1/276
See application file for complete search history.

(56) References Cited

U.S. PATENT DOCUMENTS

| | | | |
|---|---|---|---|
| 2011/0193439 A1* | 8/2011 | Yabe ...................... | H02K 1/276 310/156.38 |
| 2014/0159532 A1* | 6/2014 | Kondou .................. | H02K 1/27 310/156.53 |
| 2019/0097503 A1* | 3/2019 | Ushida ................... | H02K 15/03 |

FOREIGN PATENT DOCUMENTS

| | | |
|---|---|---|
| JP | 2013-66345 A | 4/2013 |
| JP | 2013-162617 A | 8/2013 |

(Continued)

OTHER PUBLICATIONS

International Search Report for PCT/JP2019/011512 dated, Jun. 18, 2019 (PCT/ISA/210).

*Primary Examiner* — Thomas Truong
(74) *Attorney, Agent, or Firm* — Sughrue Mion, PLLC

(57) ABSTRACT

The invention reduces tensile stress generated in the rotor core in a radial direction when a rotor core and a rotor support member are joined. A region in an axial direction (L) in which a melted joint portion (W2) for joining a rotor core (2) and a rotor support member (9) is formed is set as an axial joint region (JR). Among a plurality of corner portions (4c) of the permanent magnet (4), at least one corner portion (4c) that overlaps with the axial joint region (JR) when seen in a radial direction and that faces an outer peripheral surface (CP2) of the rotor core (2) is set as a specific corner portion (4s). Among facing surface portions (5p) of an inner wall portion of the magnet insertion hole (5) that face the corner portions (4c), the facing surface portion (5p) that faces the specific corner portion (4s) is set as a specific facing surface portion (5s). A clearance (G) formed between the specific corner portion (4s) and the specific facing surface portion (5s) is larger than a clearance formed between another corner portion (4c) and another facing surface portion (5p).

20 Claims, 10 Drawing Sheets

(56) References Cited

FOREIGN PATENT DOCUMENTS

| | | |
|---|---|---|
| JP | 2015-089149 A | 5/2015 |
| JP | 2015-119557 A | 6/2015 |
| JP | 2016-163395 A | 9/2016 |
| WO | 2010/058609 A | 5/2010 |

* cited by examiner

ROTOR FOR ROTARY ELECTRIC MACHINE

CROSS REFERENCE TO RELATED APPLICATIONS

This application is a National Stage of International Application No. PCT/JP2019/011512 filed Mar. 19, 2019, claiming priority based on Japanese Patent Application No. 2018-055845, filed Mar. 23, 2018, the entire contents of which are incorporated herein by reference.

TECHNICAL FIELD

The present disclosure is related to a rotor for a rotary electric machine that is provided with a cylindrical rotor core configured by stacking electromagnetic steel plates in an axial direction and having a plurality of magnet insertion holes, and a plurality of permanent magnets inserted into the magnet insertion holes, and that is supported from a radial inner side by a rotor supporting member.

BACKGROUND ART

Japanese Unexamined Patent Application Publication No. 2015-119557 (JP 2015-119557 A) discloses a rotor (1) for a rotary electric machine in which a rotor core (20) configured by stacking a plurality of electromagnetic steel plates (23) in an axial direction is supported by a shaft body (10) serving as a rotor support member from a radial inner side (the reference signs in the brackets in the BACKGROUND ART are signs of the referenced document). In the rotor core (20), a plurality of magnet insertion holes (24) extending in the axial direction are formed along a circumferential direction, and a permanent magnet (26) is inserted in each of the magnet insertion holes (24). The rotor core (20) and the shaft body (10) are joined by welding at end portions on an axial outer side of a contact portion between a core inner peripheral surface (21) and an outer peripheral surface (11) of the shaft body (10).

When the rotor core (20) and the shaft body (10) are joined by welding in this way, a force of contracting from the radial outer side toward a welding spot on the radial inner side tends to be generated in the rotor core (20) due to the contraction of the melted metal. In the rotor core (20), a part positioned on the radial outer side of the magnet insertion hole (24) and having a smaller radial width, that is, a so-called bridge portion is also pulled toward the radial inner side. However, since the permanent magnet (26) is inserted in the magnet insertion hole (24), the movement of the bridge portion to the radial inner side is prevented by the permanent magnet (26). Thus, the part of the bridge portion that abuts against the permanent magnet (26) receives from the permanent magnet (26) side, a force caused by a reaction of a force of contracting toward the radial inner side. Therefore, a large tensile stress may act on root parts positioned at end portions of the bridge portion in the circumferential direction. In the electromagnetic steel plates (23) stacked in the axial direction, an adhesive force between the electromagnetic steel plates (23) in the axial direction near end portions of the rotor core (20) in the axial direction is small. Thus, depending on a stress generated in the rotor core (20), a partial deformation such as lifting of the electromagnetic steel plates (23) easily occurs around the bridge portions near the end portions in the axial direction.

RELATED ART DOCUMENTS

Patent Documents

Patent Document 1: Japanese Unexamined Patent Application Publication No. 2015-119557 (JP 2015-119557 A)

SUMMARY OF THE DISCLOSURE

Problem to be Solved by the Disclosure

In view of the above circumstances, when the rotor core and the rotor support member are joined by the melted joining part, it is desired that tensile stress that causes the partial deformation of the rotor core be reduced.

Means for Solving the Problem

In one aspect, in view of the above, a rotor for a rotary electric machine is a rotor provided with a cylindrical rotor core that is configured by stacking electromagnetic steel plates in an axial direction and that has a plurality of magnet insertion holes, and provided with a plurality of permanent magnets that are inserted in the magnet insertion holes, and supported by a rotor support member from a radial inner side. Each of the magnet insertion holes is formed to extend in the axial direction, and the magnet insertion holes are arranged along a circumferential direction. Each of the permanent magnets has a side surface portion that is a surface along the axial direction, and an end surface portion that is an end surface in the axial direction, and has a plurality of corner portions formed in a part in which the side surface portion and the end surface portion intersect. A melted joint portion is formed on an end portion in the axial direction on an inner peripheral surface of the rotor core, and the rotor core is joined to the rotor support member at the melted joint portion. A region in the axial direction in which the melted joint portion is formed is set as an axial joint region. Among the corner portions of the permanent magnet, at least one corner portion that overlaps with the axial joint region when seen in a radial direction and that faces an outer peripheral surface of the rotor core is set as a specific corner portion. Parts on an inner wall surface of the magnet insertion hole that face the respective corner portions are set as facing surface portions, and among a plurality of the facing surface portions, the facing surface portion that faces the specific corner portion is set as a specific facing surface portion. A clearance formed between the specific corner portion and the specific facing surface portion is larger than a clearance formed between another corner portion and another facing surface portion.

According to the configuration, a clearance that is larger than a clearance formed between the other corner portion and the other facing surface portion is formed between the specific corner portion and the specific facing surface portion. Thus, in the vicinity of the specific corner portion of the permanent magnet, it is possible to make it difficult for the inner wall surface of the magnet insertion hole and the permanent magnet to abut against each other. In this way, even if contraction force is generated in the rotor core from the radial outer side toward the melted joint portion on the radial inner side, reaction force from the permanent magnet side caused by contraction force is reduced. That is, tensile stress in the rotor core caused by contraction force and reaction force is also reduced. Therefore, according to the present configuration, when the rotor core and the rotor support member are joined by the melted joint portion, it is possible to reduce tensile stress that causes partial deformation of the rotor core.

Further features and advantages of the rotor for a rotary electric machine will be apparent from the following description of embodiments that will be described with reference to the drawings.

DETAILED DESCRIPTION

First Embodiment

Figure 1:
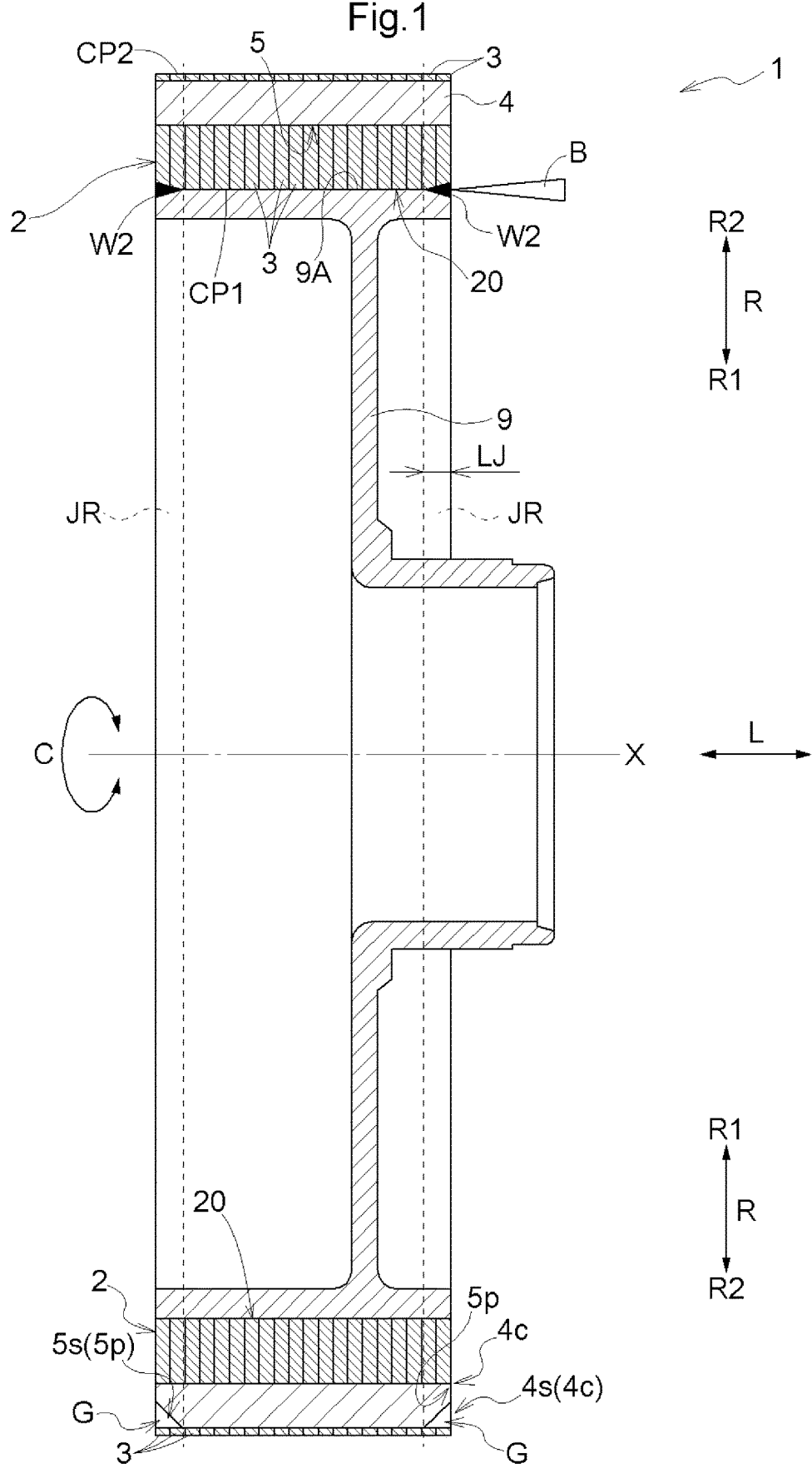
FIG. 1 is a cross-sectional view of a rotor in a rotational axis direction.
Figure 2:
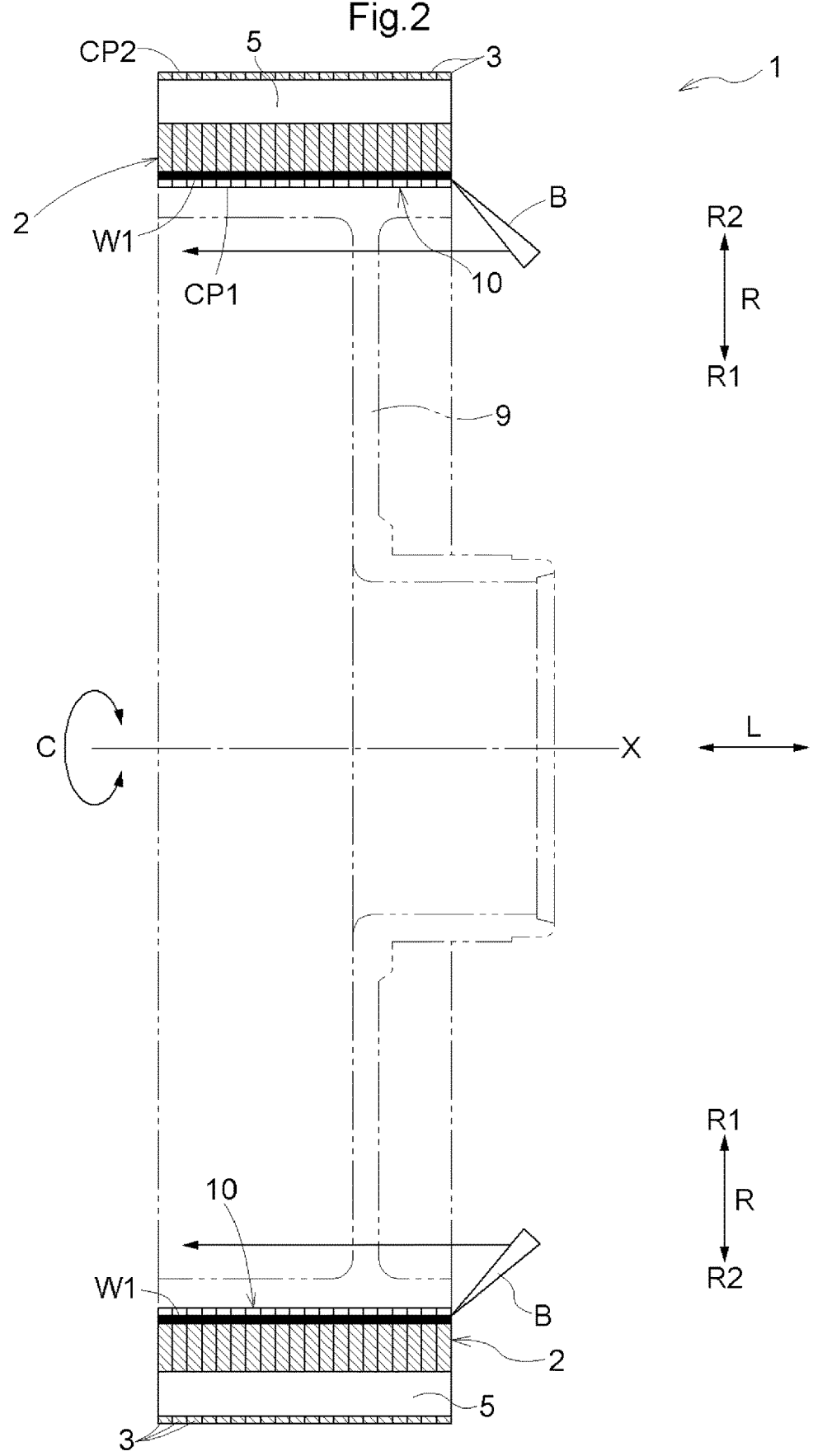
FIG. 2 is a cross-sectional view of a rotor core in the rotational axis direction.
Figure 3:
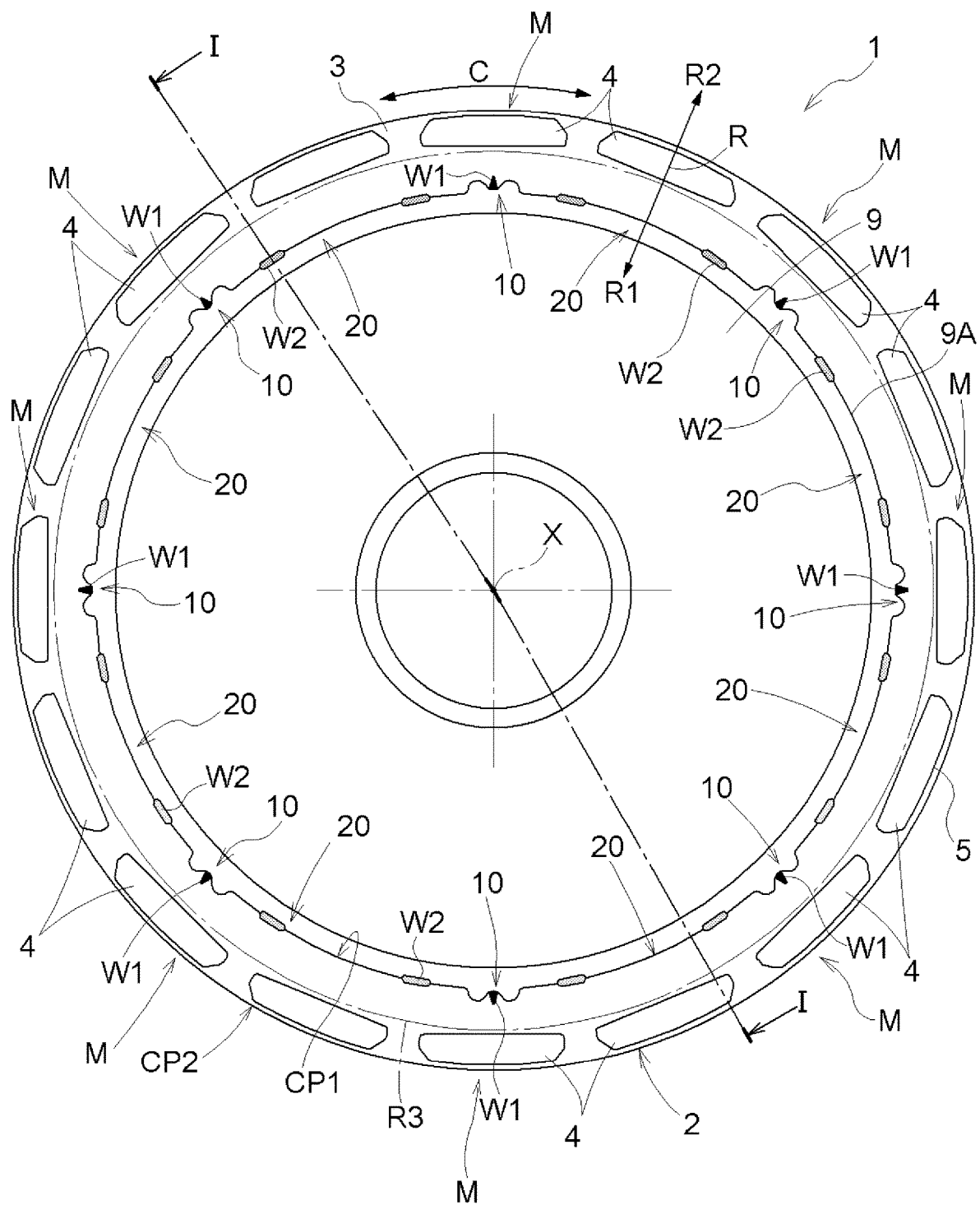
FIG. 3 is a plan view of the rotor when seen in an axial direction.

Hereinafter, a first embodiment of a rotor for a rotary electric machine will be described with reference to the drawings. FIG. 1 is a cross-sectional view of a rotor 1 (a rotor for a rotary electric machine) when seen in an axial direction L. The rotor 1 is configured to have a rotor core 2, permanent magnets 4, and a hub 9 (rotor support member) that supports the rotor core 2 and couples the rotor core 2 to a shaft (not shown) serving as a rotation axis X from a radial inner side R1. FIG. 2 is a cross-sectional view of the rotor core 2 in the axial direction L when the hub 9 is not attached to the rotor core 2. Although details will be described later, the rotor core 2 is formed by stacking a plurality of annular electromagnetic steel plates 3, and the electromagnetic steel plates 3 are joined to each other by welding before the hub 9 is attached to the rotor core 2. A symbol "W1" in FIG. 2 schematically indicates a joint portion (first joint portion) that has been melted and solidified by welding. FIG. 3 is a plan view of the rotor core 2 seen from a direction along the axial direction L.

In the present embodiment, after the electromagnetic steel plates 3 forming the rotor core 2 are joined to each other by welding, the hub 9 is attached to the rotor core 2, and the hub 9 and the rotor core 2 are joined by welding.

A symbol "W2" in FIG. 1 schematically indicates a joint portion (second joint portion (melted joint portion)) that has been melted and solidified by welding. As described above, the electromagnetic steel plates 3 of the rotor core 2 are welded to each other first and then the rotor core 2 and the hub 9 are welded. FIG. 2 shows a section passing through the first joint portion W1 before attaching the hub 9 to the rotor core 2. FIG. 1 shows a I-I section (a section passing through the second joint portion W2 and a buffer clearance G described below) in FIG. 3 after the hub 9 is attached to the rotor core 2.

Hereinafter, the rotor 1 according to the present embodiment will be described in detail. In the following description, the "axial direction L", a "radial direction R", and a "circumferential direction C" are determined with reference to the shaft center the rotor core 2 (that is, the rotation axis X), unless otherwise specified. One side of the rotor core 2 in the radial direction R is set as a radial inner side R1, and the other side in the radial direction R is set as a radial outer side R2. The dimension of each member, the direction in which each member is disposed, and the position in which each member is disposed, and the like include a state in which there is a difference caused by errors (errors on a level allowable in manufacturing). When the single permanent magnet 4 is indicated, the direction in a state in which the permanent magnet 4 is attached to the rotor core 2 is indicated.

As illustrated in FIG. 1 and FIG. 3, the rotor 1 includes a cylindrical rotor core 2 having a plurality of magnet insertion holes 5, and a plurality of the permanent magnets 4 that are inserted into the magnet insertion holes 5, and is supported by the hub 9 from the radial inner side R1. In many cases, the rotor core 2 that configures the rotor of the rotary electric machine is formed in a state of a stacked core in which a plurality of thin steel plates are stacked in a direction along the rotation axis, in order to reduce iron loss. In the present embodiment, as illustrated in FIG. 1 and FIG. 2, the rotor core 2 is configured by stacking the electromagnetic steel plates 3 in the axial direction L. The rotor core 2 is fixed to the shaft (not shown) serving as the rotation axis X via the hub 9. As illustrated in FIG. 1, the hub 9 abuts against an inner peripheral surface CP1, which is a peripheral surface of the rotor core 2 on the radial inner side R1 side, to support the rotor core 2 from the radial inner side R1. The hub 9 and the rotor core 2 are joined by welding and the rotor core 2 is supported so as not to be relatively moved to the hub 9. The hub 9 and the shaft (not shown) are coupled by shrink fitting, key connection, spline connection, or the like.

As illustrated in FIG. 3, the permanent magnets 4 are distributed in the circumferential direction C of the rotor core 2 so as to be dispersed. The magnet insertion holes 5 are arranged in the rotor core 2 along the circumferential direction. The permanent magnet 4 is disposed in each of the magnet insertion holes 5. Here, the magnet insertion holes 5 extending through the rotor core 2 in the axial direction L are formed in the rotor core 2, and the permanent magnets 4 having approximately the same length in the axial direction L as the rotor core 2 are inserted into the magnet insertion holes 5 so as to be fixed to the rotor core 2.

As described above, the rotor core 2 is configured by stacking the plurality of annular electromagnetic steel plates 3 in the axial direction L. In order to fix the electromagnetic steel plates 3, the electromagnetic steel plates 3 that are adjacent in the axial direction L are joined to each other by welding. Thus, welded portions 10 for welding the electromagnetic steel plates 3 to each other are formed on the inner peripheral surface CP1 of the rotor core 2.

An energy beam B such as an electron beam or a laser beam is emitted on the welded portions 10 to melt and then solidify the electromagnetic steel plates 3. Thus, the electromagnetic steel plates 3 that are adjacent in the axial direction L are welded. As illustrated in FIG. 2, the energy beam B is emitted on the welded portions 10 along the axial direction L so as to join the electromagnetic steel plates 3 as one rotor core 2. The first joint portions W1 indicate parts in which the electromagnetic steel plates 3 are melted and solidified by the energy beam B that is emitted in the axial direction L.

All parts of the welded portions 10 are each formed on the radial outer side R2 side with respect to a reference peripheral surface CR that is a peripheral surface of a general portion 20 of the inner peripheral surface CP1 of the rotor core 2 besides the welded portion 10. In other words, the reference peripheral surface CR corresponds to an inner wall of a virtual cylinder whose cross section with the rotation axis X as the center is a perfect circle. Since all parts of the welded portion 10 are each formed on the radial outer side R2 with respect to the reference peripheral surface CR, the first joint portions W1 are also formed on the radial outer side R2 with respect to the reference peripheral surface CR, and the first joint portions W1 do not hinder abutment between the hub 9 and the rotor core 2.

Figure 4:
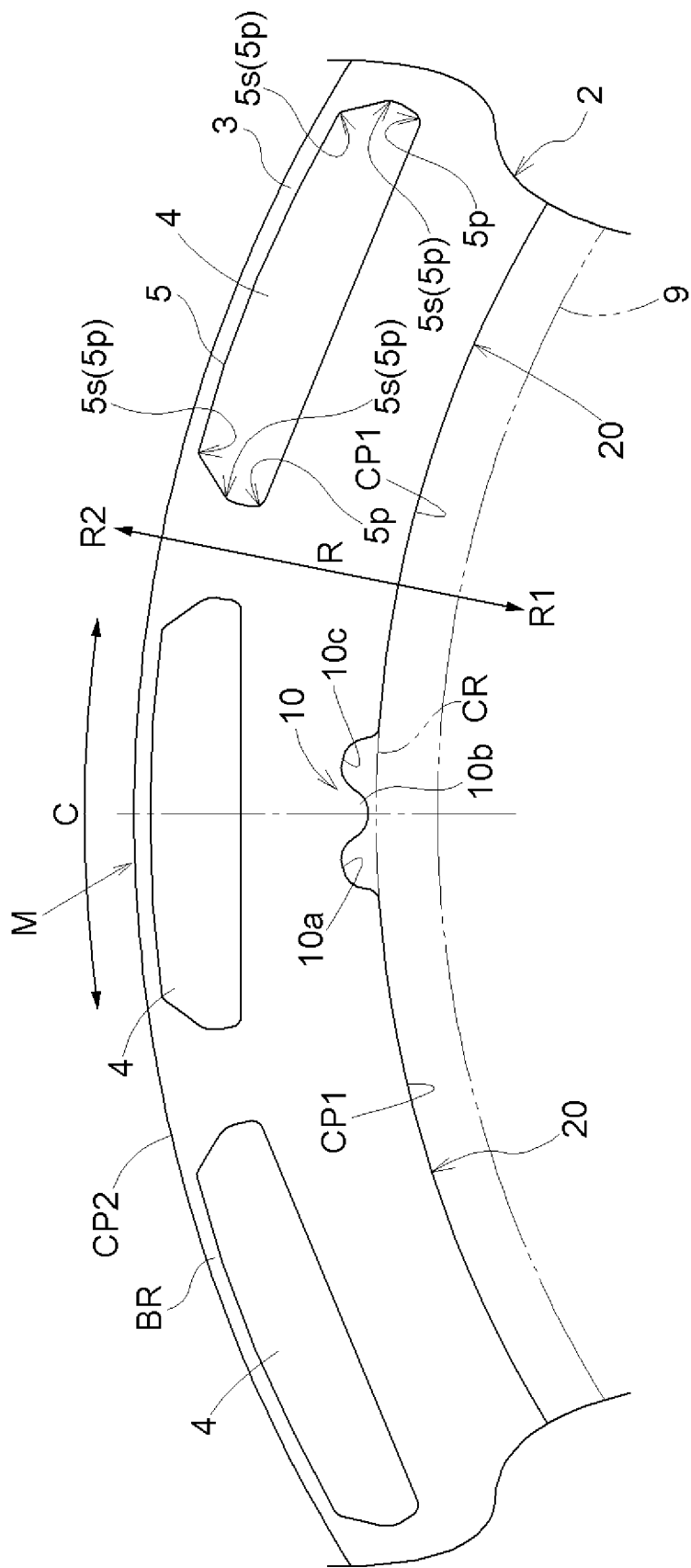
FIG. 4 is an enlarged plan view of the rotor core when seen in the axial direction.

As illustrated in FIG. 4, the welded portion 10 is configured to have a first recessed groove portion 10*a*, a second recessed groove portion 10*c*, and a protruded portion 10*b* therebetween. The protruded portion 10*b* is formed so that a top portion, which is an end portion on the radial inner side R1, is positioned on the radial outer side R2 of the reference peripheral surface CR. The energy beam B is emitted with the top portion of the protruded portion 10*b* set as a target. The first recessed groove portion 10*a* and the second recessed groove portion 10*c* are formed on both sides of the protruded portion 10*b* in the circumferential direction C and are recessed toward the radial outer side R2. Thus, the possibility that the melted electromagnetic steel plates 3 protrudes to the radial inner side R1 is low. Therefore, the first joint portion W1 is formed so as not to prevent the rotor core 2 and the hub 9 from being joined, without protruding to the radial inner side R1 of the reference peripheral surface CR.

The hub 9 abuts against the general portion 20 and is fixed to the rotor core 2. Specifically, the hub 9 is fixed to the rotor core 2 while an outer peripheral surface 9A of the hub 9 abuts against the general portion 20 on the inner peripheral surface CP1 of the rotor core 2. As illustrated in FIG. 1 and FIG. 3, at both end portions in the axial direction L, the energy beam B is emitted on the parts in which the hub 9 and the general portion 20 abut, the hub 9 and the rotor core 2 are welded, and the second joint portions W2 are formed. As illustrated in FIG. 3, here, one permanent magnet 4 forms one magnetic pole M, and a plurality of the magnetic poles M are arranged along the circumferential direction C. The second joint portions W2 are each formed in a partial region of the inner peripheral surface CP1 of the rotor core 2 in the circumferential direction C and are each disposed between two magnetic poles M that are adjacent in the circumferential direction C. Further, the second joint portions W2 are formed over the plurality of electromagnetic steel plates 3. As illustrated in FIG. 1, a region in which the second joint portion W2 (melted joint portion) is formed in the axial direction L is referred to as an axial joint region JR.

Figure 5:
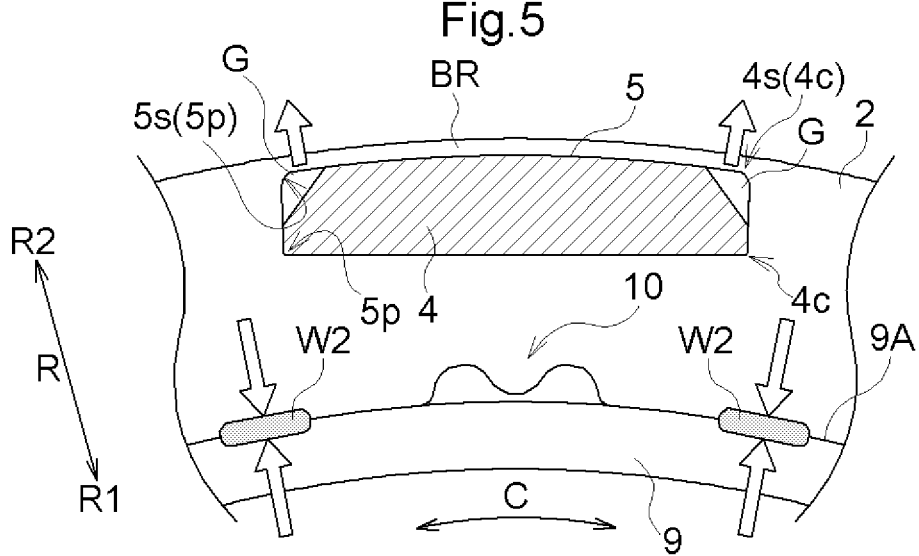
FIG. 5 is an enlarged plan view of the vicinity of a permanent magnet of the rotor core when seen in the axial direction.
Figure 6:
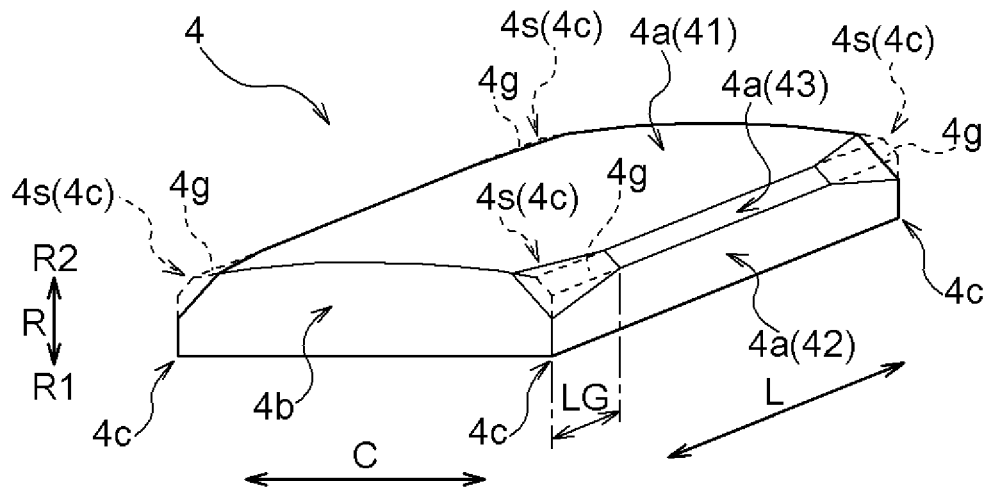
FIG. 6 is a perspective view of the permanent magnet.

FIG. 5 is an enlarged plan view of the vicinity of the permanent magnet 4 of the rotor core 2. FIG. 6 is a perspective view of the permanent magnet 4. As illustrated in FIG. 6, each permanent magnet 4 has side surface portions 4*a* that are surfaces along the axial direction L and end surface portions 4*b* that are end surfaces in the axial direction L, and also has a plurality of corner portions 4*c* that are formed in a part in which the side surface portions 4*a* and the end surface portions 4*b* intersect. Among the corner portions 4*c*, at least one of the corner portions 4*c* that overlaps with the axial joint region JR when seen in the radial direction and that faces an outer peripheral surface CP2 of the rotor core 2 (faces the outer peripheral surface CP2 side of the rotor core 2) is referred to as a specific corner portion 4*s*.

Each magnet insertion hole 5 has on the inner wall surface, facing surface portions 5*p* that are parts that face the corner portions 4*c* of the permanent magnet. Among a plurality of the facing surface portions 5*p* that face the corner portions 4*c*, the facing surface portion 5*p* that faces the specific corner portion 4*s* is referred to as a specific facing surface portion 5*s*. In the present embodiment, each clearance (G) that is formed between the specific corner portion 4*s* and the specific facing surface portion 5*s* is set to be a buffer clearance G that is larger than the clearances formed between the other corner portions 4*c* and the other facing surface portions 5*p*. Here, the clearance (G) is a space formed between the corner portion 4*c* and the facing surface portion 5*p*. In the present embodiment, the corner portion 4*c* and the facing surface portion 5*p* face each other while no other member is disposed between the corner portion 4*c* and the facing surface portion 5*p*. Thus, the entire region sandwiched between the corner portion 4*c* and the facing surface portion 5*p* corresponds to the clearance (G). In the present embodiment, a length LG in the axial direction L of the region in which the buffer clearance G is formed is equal to or longer than a length LJ in the axial direction L of the axial joint region JR. Such a configuration is preferable in reducing tensile stress described below.

In the embodiment illustrated in FIG. 5, the buffer clearances G are formed by forming chamfers 4*g* that are larger than the other corner portions 4*c* on the specific corner portion 4*s* of the permanent magnet 4, as illustrated in FIG. 6. That is, by forming the chamfer 4*g*, it is possible to provide the buffer clearance G by setting the clearance formed between the specific corner portion 4*s* and the specific facing surface portion 5*s* to be larger than the clearance formed between the corner portions 4*c* excluding the specific corner portion 4*s* and the facing surface portions 5*p*.

In the present embodiment, the permanent magnet 4 has a cross-sectional shape, which is orthogonal to the axial direction L, that is a rectangular shape. A "rectangular shape" is not limited to an accurate rectangular shape, but refers to a shape in which general shape is a rectangle. For example, as illustrated in FIG. 3 to FIG. 6, a "rectangular shape" also includes a shape in which one side is curved or a shape in which a spot corresponding to a corner of the rectangle is chamfered in a straight line or a curved line, when the general shape is assumed to be a rectangle, such as a shape in which the cross-sectional shape is a D-shape. The permanent magnet 4 having a rectangular cross-sectional shape has four side surface portions 4a and two end surface portions 4b since the general three-dimensional shape is a rectangular parallelepiped.

As illustrated in FIG. 6, the permanent magnet 4 has six side surface portions 4a when the cross-sectional shape is a D-shape (or a shape chamfered at positions corresponding to corners of the rectangle in the cross section). The side surface portion 4a indicated by a reference sign 43 is the side surface portion 4a (connection side surface portion 43) that connects the side surface portion 4a along the circumferential direction C indicated by a reference sign 41 (an outer peripheral side surface portion 41 (first main side surface portion) described below) and the side surface portion 4a along the radial direction R indicated by a reference sign 42 (a lateral side surface portion 42 (second main side surface portion)). Thus, the connection side surface portion 43 can be included in the outer peripheral side surface portion 41 (first main side surface portion) or the lateral side surface portion 42 (second main side surface portion). Viewed in this way, as illustrated in FIG. 6, it can be said that for the permanent magnet 4 in which the cross-cross-sectional shape is a D-shape (or a shape in which the places corresponding to the corners of the rectangle in the cross-section are chamfered), the general three-dimensional shape having four side surface portions 4a and two end surface portions 4b is a rectangular parallelepiped.

In the present embodiment, the permanent magnet 4 having a rectangular cross-sectional shape orthogonal to the axial direction L of the permanent magnet 4 is disposed in the rotor core 2 so that the outer peripheral side surface portion 41 extends along the circumferential direction C. The outer peripheral side surface portion 41 is a surface that faces the outer peripheral surface CP2 (faces the outer peripheral surface CP2 side) of the rotor core 2, among the four side surface portions 4a. Here, all the corner portions 4c (tetrahedral corner portions) in which the outer peripheral side surface portion 41 (including the connection side surface portions 43), other side portions 4a adjacent to the outer peripheral side surface portion 41 (here, the lateral side surface portions 42), and the end surface portions 4b intersect overlap with the axial joint regions JR. Thus, it is preferable that all of these corner portions 4c be set as the specific corner portions 4s.

Figure 7:
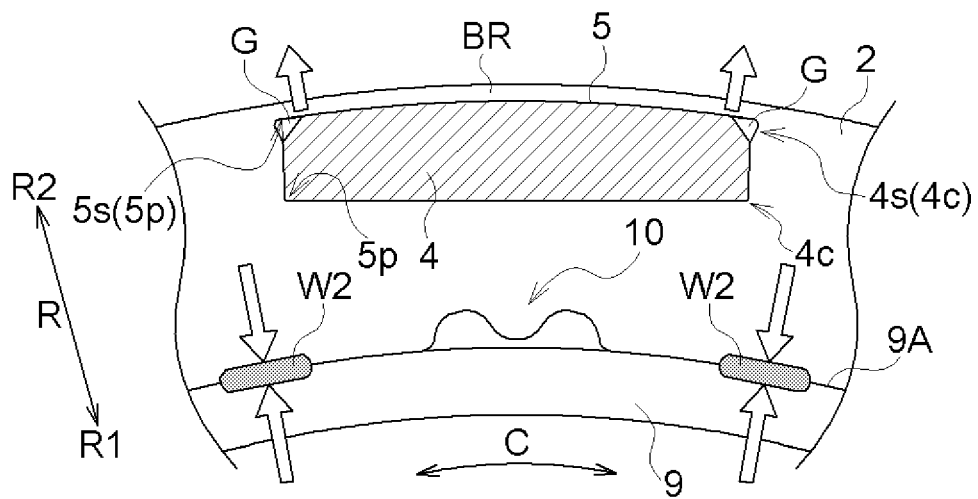
FIG. 7 is an enlarged plan view of the vicinity of a permanent magnet of a rotor core of another example when seen in the axial direction.

In the above description, referring to FIG. 5, an example is indicated in which the buffer clearances G are each provided by forming the chamfer 4g on the specific corner portion 4s of the permanent magnet 4. However, as illustrated in FIG. 7, the buffer clearances G may each be formed so that the specific facing surface portion 5s of the magnet insertion hole 5 is formed so as to have a shape recessed in the direction away from the permanent magnet 4 compared to the other facing surface portions 5p. When the buffer clearances G are formed by expanding the magnet insertion hole 5, the magnet insertion holes 5 of the electromagnetic steel plates 3 positioned at each of the end portions in the axial direction L may be expanded. It is preferable that the electromagnetic steel plates 3 that are the target be the electromagnetic steel plates 3 positioned on the axial end portion side in a range equal to or more than the length LJ of the axial joint region JR in the axial direction L. Further, it is preferable that the size in which the magnet insertion holes 5 are expanded increase toward the axial end portion.

The form in which the buffer clearances G are provided by forming the chamfers 4g on the specific corner portions 4s of the permanent magnet 4, and the form in which the buffer clearances G are provided by expanding the magnet insertion holes 5, are each described above. However, the present disclosure is not limited to either one. The buffer clearances G may be provided by forming the chamfers 4g on the specific corner portions 4s of the permanent magnet 4 and expanding the magnet insertion holes 5.

Figure 8:
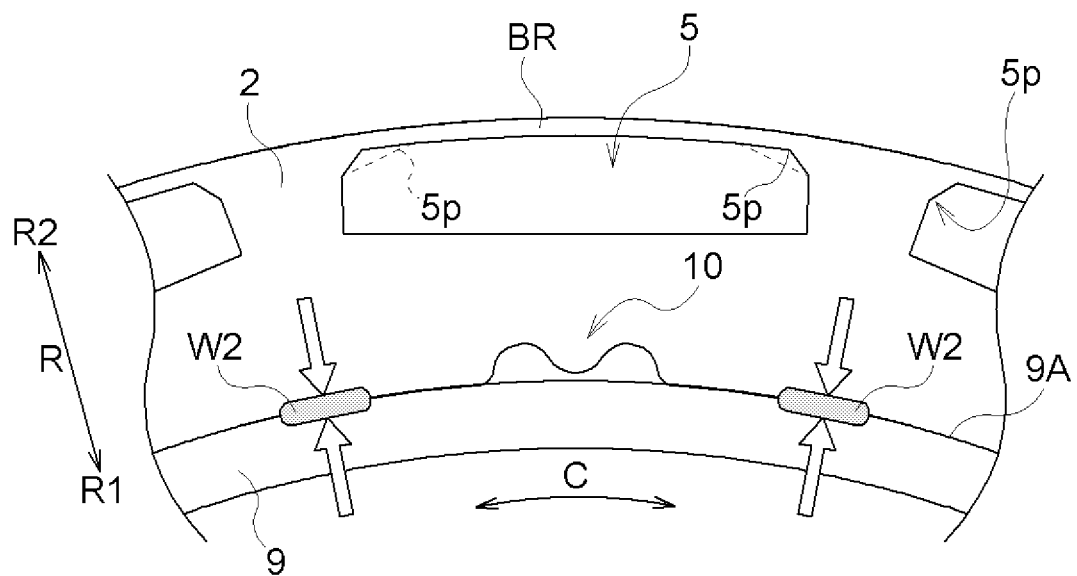
FIG. 8 is an enlarged plan view of the vicinity of a magnet insertion hole of a rotor core of a comparative example when seen in the axial direction.
Figure 9:
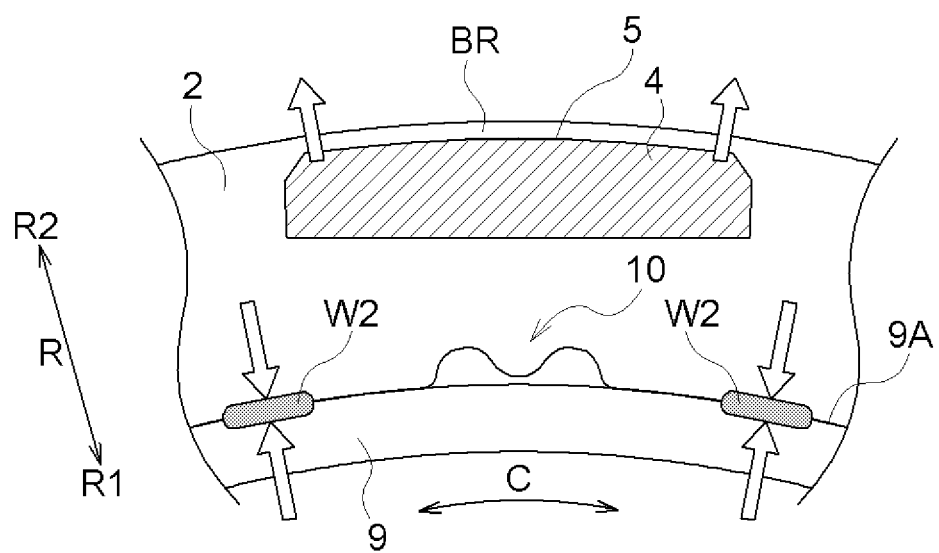
FIG. 9 is an enlarged plan view of the vicinity of a permanent magnet of the rotor core of the comparative example when seen in the axial direction.

Here, the effects of the buffer clearance G will be described with reference to FIG. 8 and FIG. 9. FIG. 8 illustrates an example in which the electromagnetic steel plates 3 are stacked, the electromagnetic steel plates 3 are joined together with the first joint portions W1, and the rotor core 2 is formed. In FIG. 8, the permanent magnet 4 is not inserted in the magnet insertion hole 5. In FIG. 9, the permanent magnet 4 is inserted in the rotor core 2 in FIG. 8.

As described above, when the rotor core 2 and the hub 9 are joined by welding, as illustrated in FIG. 8 and FIG. 9, a force of contracting from the radial outer side R2 toward the second joint portion W2 on the radial inner side R1 tends to be generated in the rotor core 2. As illustrated in FIG. 8, the part positioned on the radial outer side R2 of the magnet insertion hole 5 in the rotor core 2, that is, a so-called bridge portion BR is also pulled toward the radial inner side R1. When the permanent magnet 4 is not inserted in the magnet insertion hole 5, there is a possibility that the magnet insertion hole 5 is deformed by the force. In such a case, as shown by a broken line in FIG. 8 for example, the facing surface portions 5p on the radial outer side R2 of the magnet insertion hole 5 may be moved to the radial inner side R1.

In contrast, when the permanent magnet 4 is inserted in the magnet insertion hole 5, the inner wall of the magnet insertion hole 5 on the radial outer side R2 abuts against the permanent magnet 4. Thus, the movement of the bridge portion BR toward the radial inner side R1 is prevented by the permanent magnet 4. The inner wall of the magnet insertion hole 5 on the radial outer side R2 that abuts against the permanent magnet 4 thus receives a force from the permanent magnet 4 resulting from a reaction of the force of contracting toward the radial inner side R1. The force of contracting and the force resulting from the reaction are opposite directions from each other. A large tensile stress may act on root parts positioned at the end portions of the bridge portion BR in the circumferential direction C. The stacked electromagnetic steel plates 3 are compressed to each other along the axial direction L. The adhesive force between the stacked electromagnetic steel plates 3 is higher particularly at an axial center part compared to both end parts. Thus, deformation of each electromagnetic steel plate 3 is suppressed. However, in the electromagnetic steel plates 3 positioned at the axial end portions, such adhesive force is small. Thus, there is a possibility that the electromagnetic steel plates 3 are deformed toward the axial outer side and float up from other electromagnetic steel plates 3 and the like, due to the tensile force generated in the root parts of the bridge portions BR.

Here, as illustrated in FIG. 5 and FIG. 7, when the buffer clearances G are formed, the root parts of the bridge portions BR in the circumferential direction C do not abut against the permanent magnet 4 at the axial end portions, or the force acting between the root parts and the permanent magnet 4 becomes small even if the root parts abut against the permanent magnet 4. Thus, even if contraction force is generated in the rotor core 2, the root parts of the bridge portions BR are less susceptible to the reaction from the permanent magnet 4 at the axial end portions. As a result, tensile stress caused by contraction force and reaction force becomes small.

In the above description, a form is indicated as an example in which each of the permanent magnets 4 is disposed in the rotor core 2 so that one surface (outer peripheral side surface portion 41) that faces the outer peripheral surface CP2 of the rotor core 2 extends along the circumferential direction C, among the four side surface portions 4a of the permanent magnet 4 with a rectangular cross-sectional shape orthogonal to the axial direction L. However, how the permanent magnets 4 are disposed in the rotor core 2 is not limited to this form, and even if the permanent magnets 4 are disposed in another manner, it is preferable that the buffer clearances G be provided as described above.

Figure 10:
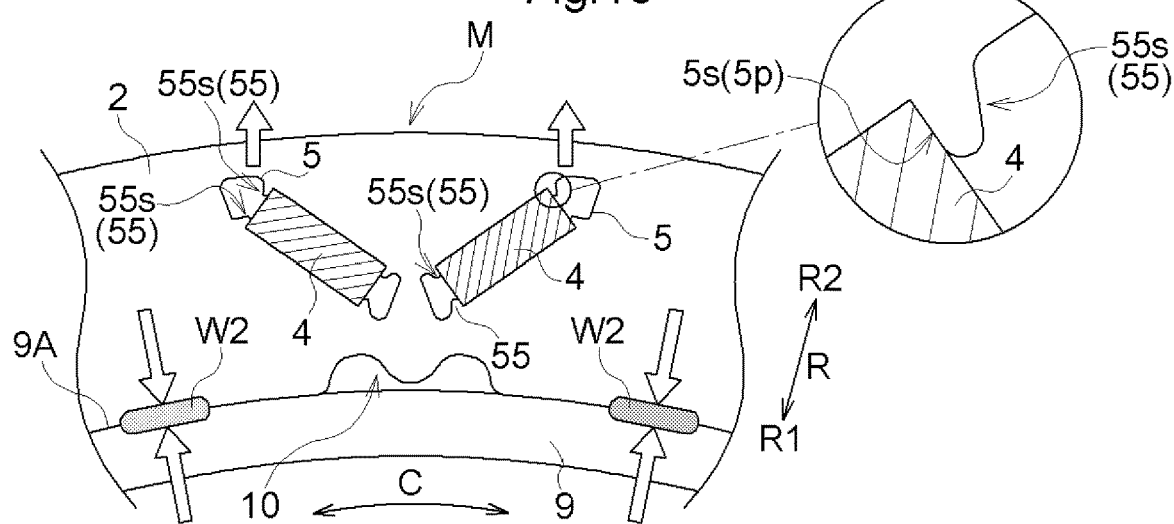
FIG. 10 is an enlarged plan view of an example of a rotor core in which the permanent magnets are disposed in a V-shape when seen in the axial direction.

FIG. 10 illustrates as an example, a form in which a pair of the permanent magnets 4 having a rectangular cross-sectional shape orthogonal to the axial direction L is disposed in the rotor core 2 so that the permanent magnets 4 are formed in a V-shape such that the distance between the permanent magnets 4 becomes closer toward the radial inner side R1 when seen in the axial direction. In this form, the magnet insertion holes 5 are formed so as to house the respective permanent magnets 4 with gaps serving as flux barriers. Thus, positioning portions 55 for disposing the permanent magnets 4 at prescribed positions in the magnet insertion holes 5 are formed in the magnet insertion holes 5. Here, four positioning portions 55 are provided so that two surfaces of the four side surface portions 4a of each rectangular permanent magnet 4 abut against four corners (dihedral corner portions) that are adjacent thereto.

As described above with reference to FIG. 8 and FIG. 9, if the positioning portions 55 and the permanent magnets 4 abut against each other, reaction force from the permanent magnets 4 is applied to the positioning portions 55, when the contraction force of contracting from the radial outer side R2 toward the second joint portions W2 on the radial inner side R1 is generated. In this way, the positioning portions 55 receive tensile stress due to contraction force and reaction force. Thus, among the positioning portions 55, the buffer clearances G are formed between the facing surface portions 5p (specific facing surface portions 5s) of specific positioning portions 55s, which will be described below, and the specific corner portions 4s of the permanent magnets 4.

Figure 11:
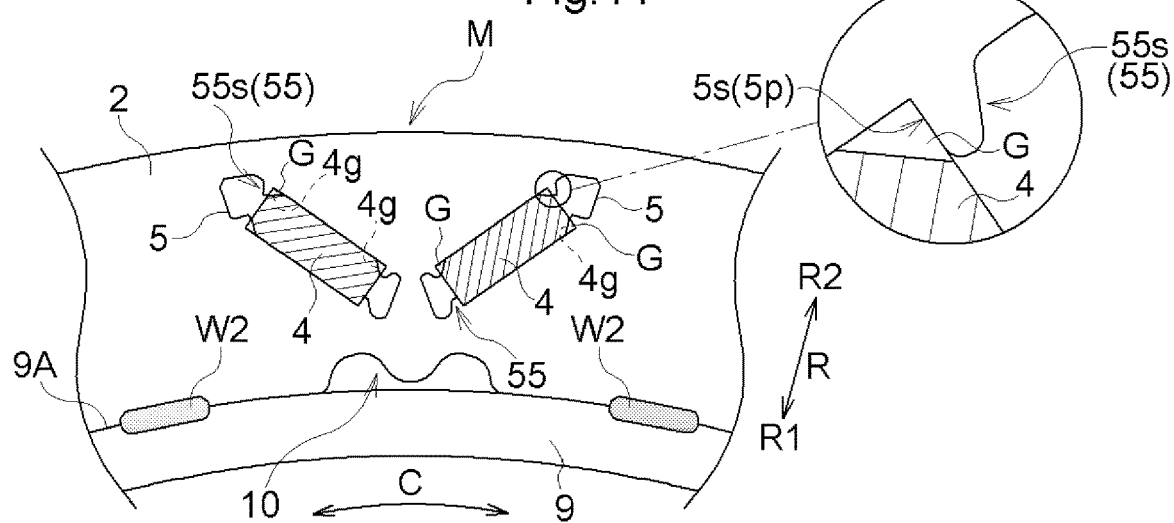
FIG. 11 is an enlarged plan view of an example in which a cushioning clearance is provided with respect to FIG. 10.
Figure 12:
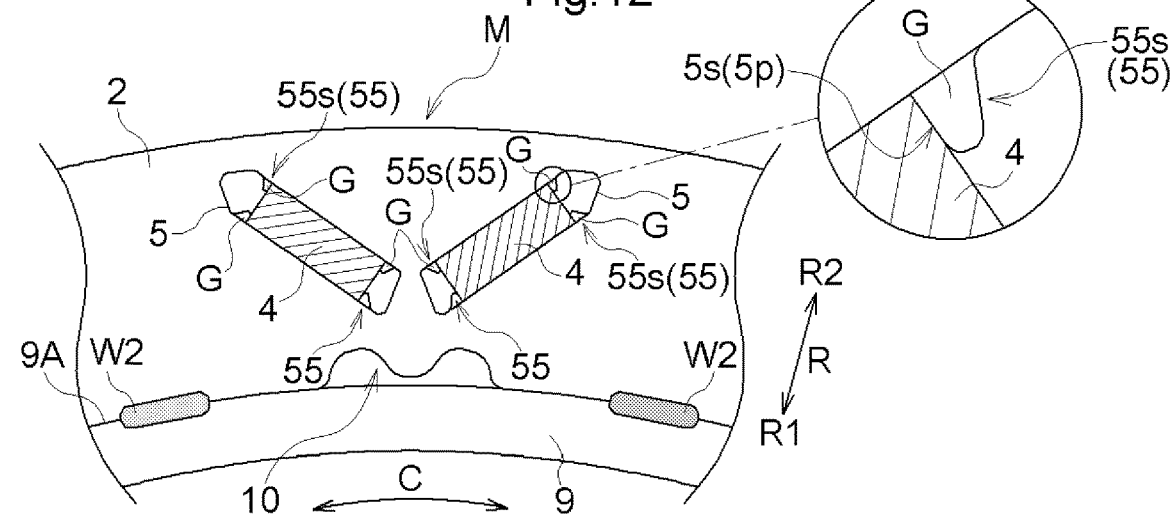
FIG. 12 is an enlarged plan view of another example in which a cushioning clearance is provided with respect to FIG. 10.

As illustrated in FIG. 11 and FIG. 12, all corner portions 4c that are corner portions 4c that face the positioning portions 55 which are formed in each of the magnet insertion holes 5 and position the permanent magnet 4 in the magnet insertion hole 5, that overlap with the axial joint regions JR when seen in the radial direction, and that face the outer peripheral surface CP2 of the rotor core 2 are set as the specific corner portions 4s. The positioning portions 55 facing the specific corner portion 4s are set as the specific positioning portions 55s. Although not shown, there are also specific facing surface portions 5s on the positioning portions 55s. As described above, the buffer clearances G are formed by setting the clearances formed between the specific corner portions 4s and the specific facing surface portions 5s to be larger than the clearances formed between the corner portions 4c excluding the specific corner portions 4s and the facing surface portions 5p.

Similar to the form described above with reference to FIG. 5 and FIG. 6, FIG. 11 illustrates an example of a form in which the buffer clearances G are provided by forming the chamfers 4g on the specific corner portions 4s of each of the permanent magnets 4. Similar to the form described above with reference to FIG. 7, FIG. 12 illustrates a form in which the buffer clearances G are provided by expanding each of the magnet insertion holes 5. In such a case, it is possible to expand the magnet insertion hole 5 and provide the buffer clearances G by not providing the specific positioning portions 55s in the axial joint regions JR for example. Although not shown, the present disclosure is not limited to either one, and the buffer clearances G may be provided by forming the chamfers 4g on the specific corner portions 4s of the permanent magnets 4 and expanding the magnet insertion holes 5.

The forms in which the buffer clearances G are provided are described above by illustrating examples of two forms of disposing the permanent magnets 4. However, even when the permanent magnets 4 are disposed in another form, tensile stress generated in the radial direction R of the rotor core 2 can be reduced by similarly providing the buffer clearances G. That is, among the corner portions 4c of the permanent magnets 4, at least one of the corner portions 4c that overlaps with the axial joint region JR when seen in the radial direction and that faces the outer peripheral surface CP2 of the rotor core 2 is set as the specific corner portion 4s. The facing surface portions 5p that face the specific corner portions 4s are set as the specific facing surface portions 5s. The buffer clearances G are provided between the specific corner portions 4s and the specific facing surface portions 5s. Thus, tensile stress can be reduced.

Figure 13:
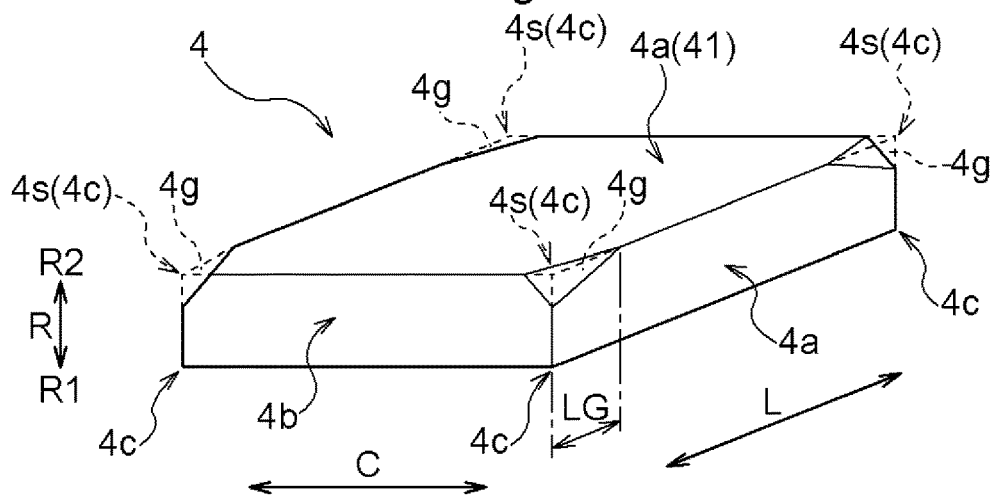
FIG. 13 is a perspective view of another example of a permanent magnet.
Figure 14:
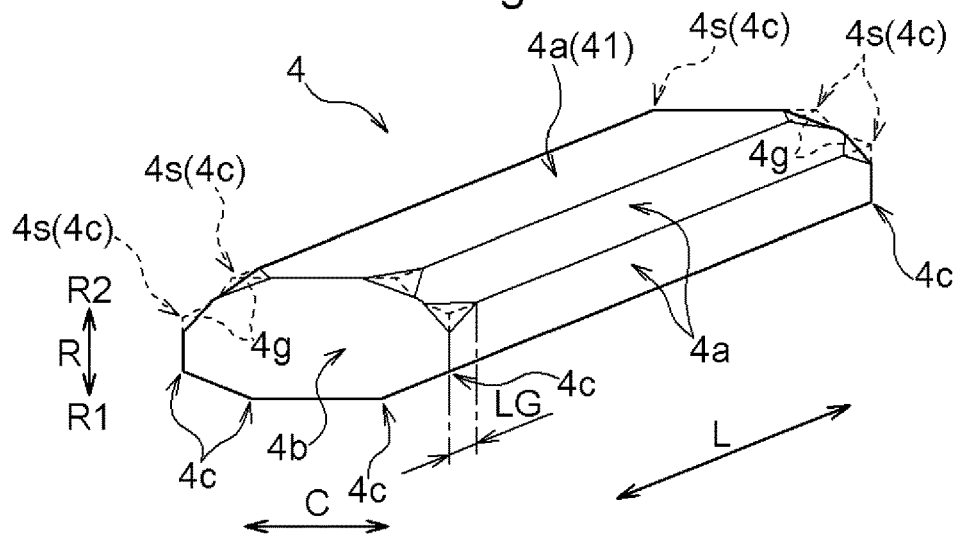
FIG. 14 is a perspective view of yet another examples of a permanent magnet.

Referring to FIG. 6, an example of a form is described above in which the chamfers 4g are formed on the permanent magnets 4 having a D-shaped cross-sectional shape in the direction orthogonal to the axial direction L. When the cross-sectional shape of the permanent magnets 4 is another shape, the buffer clearances G can be formed by forming the chamfers 4g larger than the other corner portions 4c in the specific corner portions 4s, similar to the form described above. For example, as illustrated in FIG. 13 and FIG. 14, the chamfer 4g can be formed. FIG. 13 illustrates a case in which the cross-sectional shape is a rectangle and FIG. 14 illustrates an example of a case in which the cross-sectional shape is a hexagon. In either case, the chamfers 4g larger than the chamfers formed on the other corner portions 4c are formed on the corner portions 4c (specific corner portion 4s) that overlap with the axial joint regions JR when seen in the radial direction and that face the outer peripheral surface CP2 of the rotor core 2, among the corner portions 4c of the permanent magnets 4. Thus, the buffer clearances G are formed.

Second Embodiment

Figure 15:
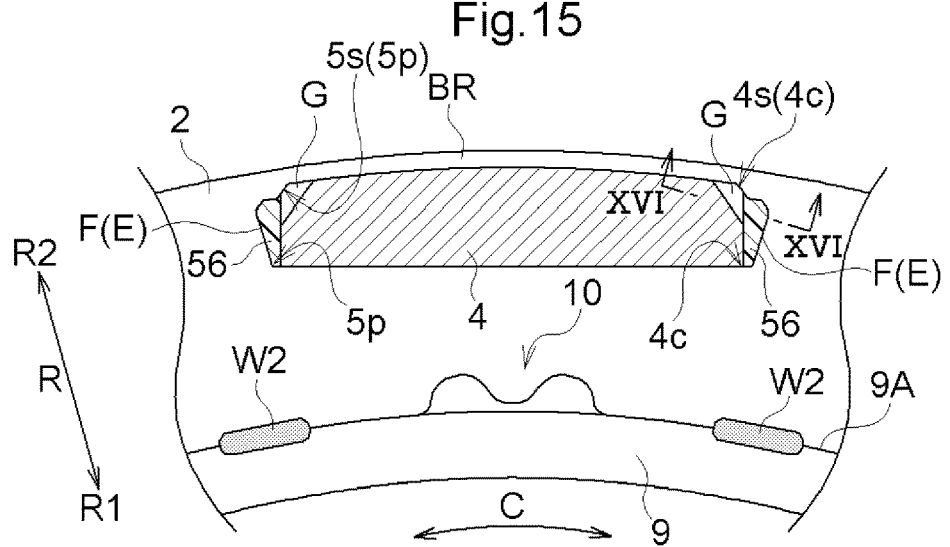
FIG. 15 is an enlarged plan view of the vicinity of a permanent magnet of a rotor core according to a second embodiment when seen in the axial direction.

Next, a second embodiment of the rotor 1 will be described with reference to FIG. 15 and FIG. 16. In the configuration of the first embodiment described above, the corner portions 4c and the facing surface portions 5p face each other while no other members are disposed between the corner portions 4c and the facing surface portions 5p. However, in the present embodiment, there are other disposed members E between the corner portions 4c and facing surface portions 5p as illustrated in FIG. 15. Hereinafter, the rotor 1 according to the present embodiment will be described focusing on the differences from the first embodiment. Points that are not particularly described are the same as those in the first embodiment.

When there are other disposed members E between the corner portions 4c and the facing surface portions 5p, the clearances (G) formed between the corner portions 4c and the facing surface portions 5p are spaces formed in a part excluding the disposed members E, between the corner portions 4c and the facing surface portions 5p. That is, the clearances (G) formed between the corner portions 4c and the facing surface portions 5p are spaces in which there are no disposed members E and the bridge portion BR of the rotor core 2 is allowed to be deformed and moved. Also in this case, the clearances (G) formed between the specific corner portions 4s and the specific facing surface portions 5s are set to be the buffer clearances G that are larger than the clearances formed between the other corner portions 4c and the other facing surface portions 5p.

In the present embodiment, the disposed members E are a fixing material F that is disposed between the inner wall surfaces of the magnet insertion holes 5 and the permanent magnets 4 to fix the permanent magnets 4 inside the respective magnet insertion holes 5. Here, as the fixing material F, various known materials such as adhesives and various resins such as a thermoplastic resin, a thermosetting resin, and a foamable resin may be used. In the present example, the fixing material F is a resin that is cured after being filled in a melted state between the inner wall surface of the magnet insertion holes 5 and the permanent magnets 4. When the fixing material F is filled, the clearances (spaces) in which there are no fixing material F between the specific corner portions 4s and the specific facing surface portions 5s are set to be larger than the clearances (spaces) in which there is no fixing material F between the other corner portions 4c and the other facing surface portions 5p. Thus, the buffer clearances G are formed. In the example illustrated in FIG. 15 and FIG. 16, the fixing material F is filled in parts between the inner wall portion of the magnet insertion hole 5 and the permanent magnet 4, while omitting the parts between the specific corner portions 4s and the specific facing surface portions 5s. Thus, the buffer clearances G are formed.

In the present embodiment, similar to the form shown in FIG. 6, the chamfers 4g larger than the chamfers formed on the other corner portions 4c are formed on the specific corner portions 4s of each permanent magnet 4. In this way, the distances between the specific corner portions 4s and the specific facing surface portions 5s are made larger than the distances between the corner portions 4c excluding the specific corner portions 4s and the facing surface portions 5p, so that larger buffer clearances G are more easily ensured. In the present embodiment, as illustrated in FIG. 15, gaps defined by the inner wall surface of the magnet insertion hole 5 and the permanent magnet 4 that are spaced away from each other are formed on both sides of the permanent magnet 4 in the circumferential direction C. The gaps become fixing material filling portions 56 in which the fixing material F is filled. The fixing material filling portions 56 are formed continuously over the entire region of the magnet insertion hole 5 in the axial direction L.

Next, a specific example of a forming method of the buffer clearances G will be described with reference to FIG. 16. FIG. 16 illustrates the forming process of each buffer clearance G while focusing on a part corresponding to a XVI-XVI cross-section in FIG. 15. As illustrated in FIG. 16, in the present example, the fixing material F is filled while the rotor core 2 is pressurized in the axial direction L by using a pressurizing member 8. The pressurizing member 8 has an abutting surface 81, a fixing material supply path 82, and a restricting protruded portion 83. Although not shown, the end surface on the other side of the rotor core 2 in the axial direction L is supported by a support member.

The abutting surface 81 is a surface of the pressurizing member 8 that abuts against the end face of the rotor core 2 in the axial direction L. In the present example, the pressurizing member 8 has a shape extending in the radial direction R and the circumferential direction C so as to cover the entire end surface of the rotor core 2 in the axial direction L. Accordingly, as illustrated in the middle drawing in FIG. 16, the abutting surface 81 is formed so as to cover an opening portion of an end portion of the magnet insertion hole 5 in the axial direction L. The fixing material supply path 82 is a flow path for supplying the fixing material F to the magnet insertion hole 5. In the present example, the fixing material supply path 82 is formed so as to extend through the pressurizing member 8 in the axial direction L. The opening portion of the fixing material supply path 82 on the abutting surface 81 side is provided at a position corresponding to the fixing material filling portion 56. The restricting protruded portion 83 is a protruded portion for restricting the fixing material F from entering, so as to form the buffer clearance G. Thus, the restricting protruded portion 83 has a shape that is protruded so as to fill at least a part of the space between the specific corner portion 4s and the specific facing surface portion 5s. In the present embodiment, the restricting protruded portion 83 has a shape corresponding to the entire space between the specific corner portion 4s and the specific facing surface portion 5s.

Figure 16:
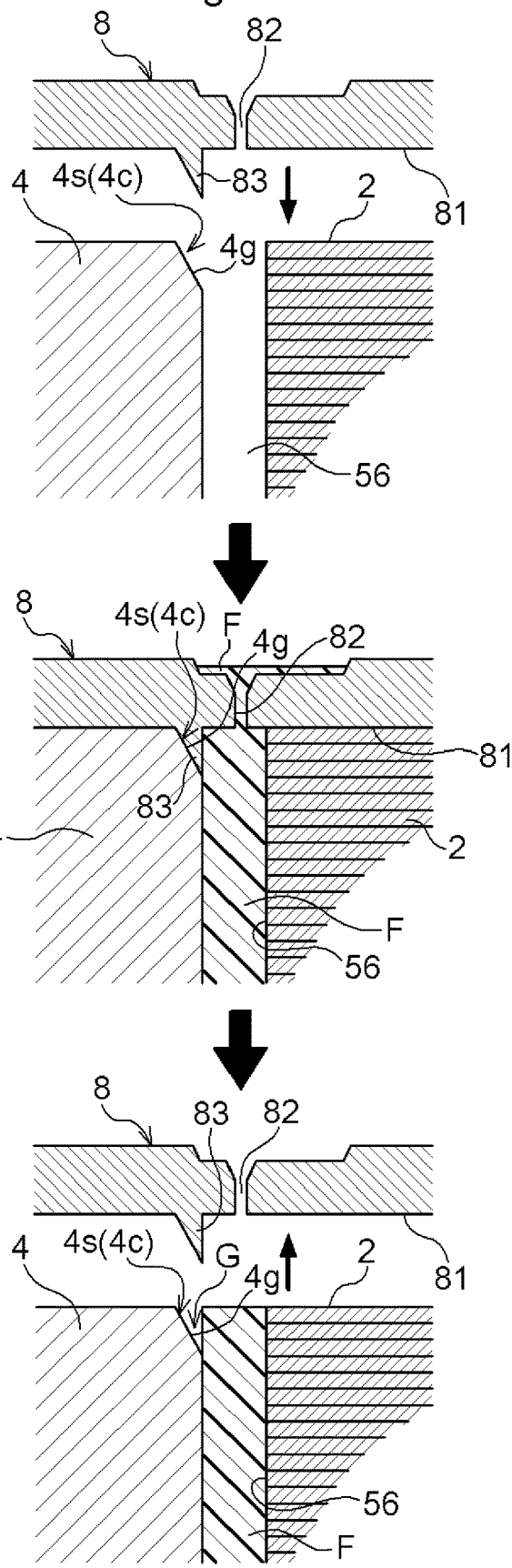
FIG. 16 is an explanatory view of a process of forming a buffer clearance G of the rotor core according to a second embodiment.

Then, when filling the fixing material F, first, as illustrated in the top drawing in FIG. 16, after the permanent magnet 4 is disposed inside the magnet insertion hole 5 of the rotor core 2, the pressurizing member 8 is moved closer to the rotor core 2. The abutting surface 81 is abutted against the end surface of the rotor core 2 in the axial direction L and the rotor core 2 is pressurized in the axial direction L. Next, the fixing material F in a flowable state is supplied to the fixing material supply path 82, as illustrated in the middle drawing in FIG. 16. As described above, the fixing material supply path 82 is opened at a position corresponding to the fixing material filling portion 56 of the magnet insertion hole 5. Thus, the fixing material F is first supplied to the fixing material filling portion 56 and then to each portion in the magnet insertion hole 5. In this way, the fixing material F is filled between the inner wall surface of the magnet insertion hole 5 and the permanent magnet 4. At this time, since the restricting protruded portion 83 is disposed so as to fill the space between the specific corner portion 4s and the specific facing surface portion 5s, the fixing material F is restricted from entering the region between the specific corner portion 4s and the specific facing surface portion 5s. Then, after the fixing material F is cured, the pressurizing member 8 is detached from the rotor core 2, as illustrated in the bottom drawing in FIG. 16. In this way, the buffer clearance G in which there is no fixing material F is formed in the space corresponding to the restricting protruded portion 83. The fixing material F is filled while the abutting surface 81 is abutted against the end surface of the rotor core 2 in the axial direction L and the rotor core 2 is pressurized by the pressurizing member 8 in the axial direction L. Thus, it is possible to suppress the fixing material F from entering the clearance of the electromagnetic steel plates 3 forming the rotor core 2, and suppress the fixing material F supplied to the magnet insertion hole 5 from flowing backward and protruding outside the magnet insertion hole 5.

As described above, the buffer clearances G are formed between the specific corner portions 4s and the specific facing surface portions 5s. Thus, even when the fixing material F is filled between the inner wall surfaces of the magnet insertion holes 5 and the permanent magnets 4, it is possible to suppress the movement of the bridge portions BR to the radial inner side R1 with the fixing material F.

Therefore, similar to the case of the first embodiment, when the rotor core 2 and the hub 9 are joined by the second joint portions W2 (melted joint portions), tensile stress that causes partial deformation of the rotor core 2 can be reduced.

In the present embodiment, an example has been described in which the fixing material F is suppressed from entering the entire space between the specific corner portions 4s and the specific facing surface portions 5s. However, the present disclosure is not limited to this, and the fixing material F may be disposed in a part of the space between the specific corner portions 4s and the specific facing surface portions 5s. However, also in this case, the buffer clearances G formed between the specific corner portions 4s and the specific facing surface portions 5s are set to be larger than the clearances formed between the other corner portions 4c and the other facing surface portions 5p.

In the present embodiment, a configuration is described as an example in which chamfers 4g that are larger than chamfers formed on the other corner portions 4c are formed on the specific corner portions 4s of the permanent magnets 4. However, the configuration is not limited to this. For example, as illustrated in FIG. 7, the specific facing surface portions 5s of each magnet insertion hole 5 may be formed so as to have a shape recessed in the direction away from the permanent magnet 4 compared to the other facing surface portions 5p, or the chamfers 4g may be formed on the specific corner portions 4s of the permanent magnet 4 and the specific facing surface portions 5s of the magnet insertion hole 5 may be expanded so as to be recessed. Further, for example, intervals at which the specific corner portions 4s and the specific facing surface portions 5s face each other maybe configured to be similar to intervals at which the other corner portions 4c and the other facing surface portions 5p face each other, and the buffer clearances G may be formed depending on the disposition state of the disposed members E such as the fixing material F. In such a case, the spaces (buffer clearances G) formed in parts excluding the disposed members E, between the specific corner portions 4s and the specific facing surface portions 5s are set to be larger than the spaces formed in part excluding the disposed members E, between the other corner portions 4c and the other facing surface portions 5p. For example, such a configuration can be realized by not filling the fixing material F as the disposed members E between the specific corner portions 4s and the specific facing surface portions 5s, and filling the fixing material F between the other corner portions 4c and the other facing surface portions 5p.

Other Embodiments

Hereinafter, other embodiments will be described. The configuration of each embodiment described below may not only be used by itself, but also be combined with any of the configurations of the other embodiments unless inconsistency arises.

Figure 17:
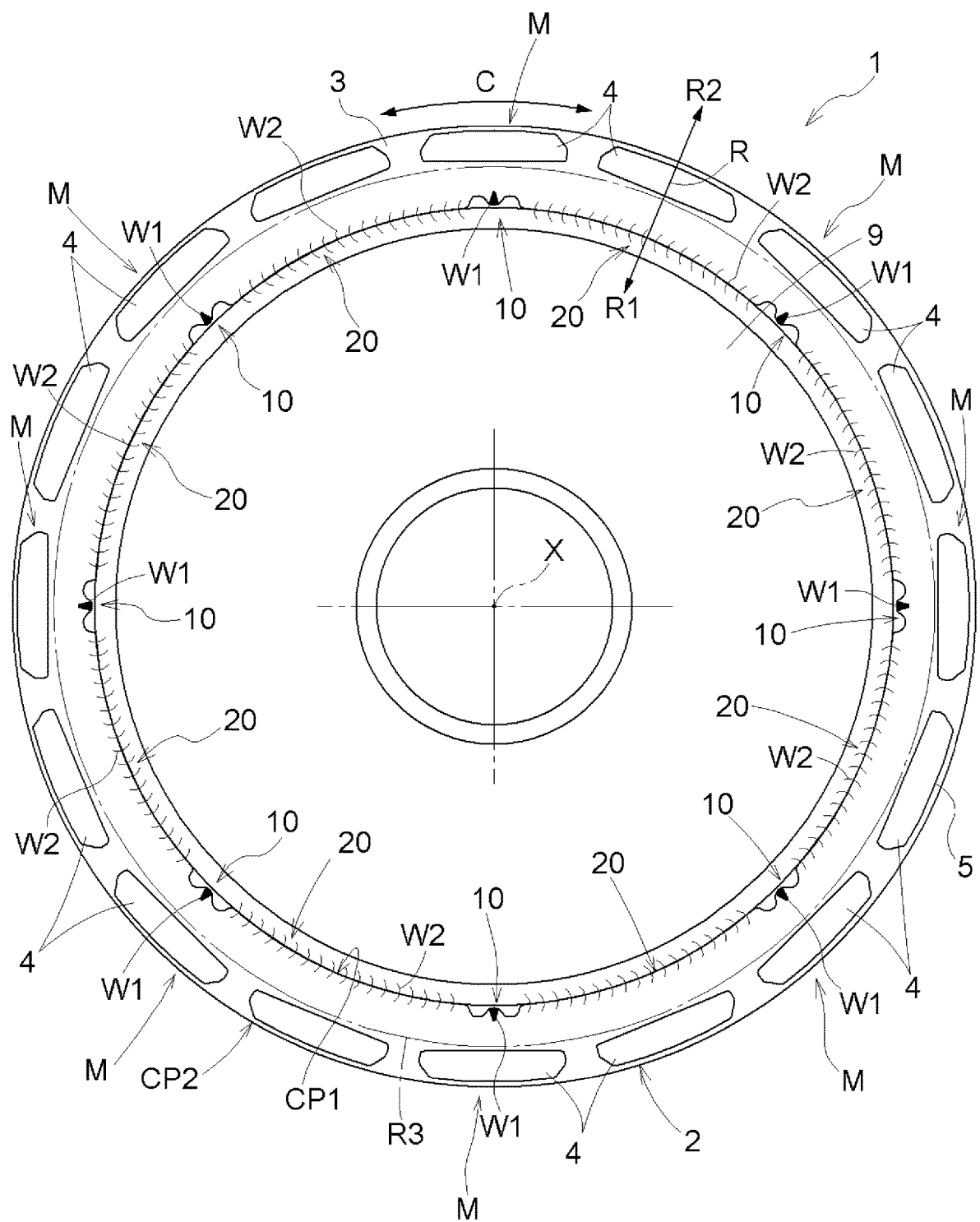
FIG. 17 is a plan view of another form of a rotor when seen in the axial direction.

(1) A form is described above as an example in which the second joint portions W2 are disposed in the partial region of the inner peripheral surface CP1 of the rotor core 2 in the circumferential direction C, as illustrated in FIG. 3 and the like. Specifically, the configuration is described as an example in which each second joint portion W2 is disposed between two magnetic poles M adjacent in the circumferential direction C. However, as illustrated in FIG. 17, the second joint portions W2 may be formed throughout an entire circumferential part in which the hub 9 and the general portion 20 abut against each other.

(2) A form is described above as an example in which the second joint portions W2 are disposed at all positions between two magnetic poles M that are adjacent along the circumferential direction C, as illustrated in FIG. 3 and the like. However, although not shown, the second joint portions W2 may be disposed at some of the positions between two magnetic poles M that are adjacent along the circumferential direction C. For example, the second joint portions W2 may be disposed at every other position between two magnetic poles M that are adjacent along the circumferential direction C.

(3) A form is described as an example in which a fixing member such as a so-called end plate is not provided at both ends of the rotor core 2 in the axial direction L. However, in addition to fixing performed by the second joint portions W2, the rotor core 2 may be fixed by clinching or bolts using a fixing member such as an end plate. By providing the buffer clearances G, it is possible to also suppress the end plates from deforming as a result of deformation of the electromagnetic steel plates 3 caused by tensile stress.

(4) A configuration is described above as an example in which the length LG in the axial direction L of the region in which the buffer clearance G is formed is equal to or more than the length LJ in the axial direction L of the axial joint region JR. However, the configuration is not limited to this, and the length LG in the axial direction L of the region in which the buffer clearance G is formed may be smaller than the length LJ in the axial direction L of the axial joint region JR.

Summary of Embodiments

Hereinafter, an overview of a rotor (1) for a rotary electric machine described above will be described simply.

As one aspect, the rotor (1) for a rotary electric machine is provided with a cylindrical rotor core (2) that is configured by stacking electromagnetic steel plates (3) in an axial direction (L) and that has a plurality of magnet insertion holes (5), and provided with a plurality of permanent magnets (4) that are inserted in the magnet insertion holes (5), and supported by a rotor support member (9) from a radial inner side (R1), in which each of the magnet insertion holes (5) is formed to extend in the axial direction (L), and the magnet insertion holes (5) are arranged along a circumferential direction (C), each of the permanent magnets (4) has a side surface portion (4a) that is a surface along the axial direction (L), and an end surface portion (4b) that is an end surface in the axial direction (L), and has a plurality of corner portions (4c) formed in a part in which the side surface portion (4a) and the end surface portion (4b) intersect, a melted joint portion (W2) is formed on an end portion in the axial direction (L) on an inner peripheral surface (CP1) of the rotor core (2), and the rotor core (2) is joined to the rotor support member (9) at the melted joint portion (W2), a region in the axial direction (L) in which the melted joint portion (W2) is formed is set as an axial joint region (JR), among the corner portions (4c) of the permanent magnet, at least one corner portion (4c) that overlaps with the axial joint region (JR) when seen in a radial direction and that faces an outer peripheral surface (CP2) of the rotor core (2) is set as a specific corner portion (4s), parts on an inner wall surface of the magnet insertion hole (5) that face the respective corner portions (4c) are set as facing surface portions (5p), and among a plurality of the facing surface portions (5p), the facing surface portion (5p)

that faces the specific corner portion (4s) is set as a specific facing surface portion (5s), and a clearance formed between the specific corner portion (4s) and the specific facing surface portion (5s) is larger than a clearance (G) formed between another corner portion (4c) and another facing surface portion (5p).

With such a configuration, the clearance (G) that is larger than the clearance formed between the other corner portion (4c) and the facing surface portion (5p) is formed between the specific corner portion (4s) and the specific facing surface portion (5s). Thus, it is possible to make it difficult for the inner wall surface of the magnet insertion hole (5) and the permanent magnet (4) to abut against each other, at the vicinity of the specific corner portion (4s) of the permanent magnet (4). In this way, even if contraction force from the radial outer side (R2) toward the melted joint portion (W2) on the radial inner side (R1) is generated in the rotor core (2), reaction force from the permanent magnet (4) side due to contraction force is reduced. That is, tensile stress in the rotor core (2) caused by contraction force and reaction force is also reduced. Therefore, with the present configuration, it is possible to reduce tensile stress that causes partial deformation of the rotor core (2) when the rotor core and the rotor support member (9) are joined by the melted joint portion (W2).

Here, it is preferable that the clearance (G) be a space formed between the corner portion (4c) and the facing surface portion (5p), and when there is another disposed member (E) between the corner portion (4c) and the facing surface portion (5p), the clearance (G) be a space formed in a part excluding the disposed member (E), between the corner portion (4c) and the facing surface portion (5p).

With such a configuration, regardless of whether there is the other disposed member (E) between the corner portion (4c) and the facing surface portion (5p), the clearance (G) that is larger than the clearance formed between the other corner portion (4c) and the other facing surface portion (5p) is formed between the specific corner portion (4s) and the specific facing surface portion (5s). Thus, regardless of whether there is the other disposed portion (E), it is possible to make it difficult for the inner wall surface of the magnet insertion hole (5) and the permanent magnet (4) to abut against each other at the vicinity of the specific corner portion (4s) of the permanent magnet (4).

It is preferable that the disposed member (E) be a fixing material (F) disposed between the inner wall surface of the magnet insertion hole (5) and the permanent magnet (4) to fix the permanent magnet (4) inside the magnet insertion hole (5).

With such a configuration, it is possible to fix the permanent magnet (4) inside the magnet insertion hole (5) with the fixing material (F), and it is also possible to make it difficult for the inner wall surface of the magnet insertion hole (5) and the permanent magnet (4) to abut against each other at the vicinity of the specific corner portion (4s) of the permanent magnet (4) regardless of whether the fixing material (F) is disposed between the corner portion (4c) and the facing surface portion (5p).

Here, it is preferable that a chamfer (4g) larger than a chamfer formed in the other corner portion (4c) be formed in the specific corner portion (4s) of the permanent magnet (4).

With such a configuration, by cutting a part of the permanent magnet (4), it is possible to make the clearance (G) between the specific corner portion (4s) and the specific facing surface portion (5s) larger than the clearance between the corner portion (4c) other than the specific corner portion (4s) and the facing surface portion (5p).

It is preferable that the specific facing surface portion (5s) of the magnet insertion hole (5) be formed so as to be a shape recessed toward a direction away from the permanent magnet (4) compared to the other facing surface portion (5p).

With such a configuration, by expanding a part of the magnet insertion hole (5), it is possible to make the clearance (G) between the specific corner portion (4s) and the specific facing surface portion (5s) larger than the clearance between the corner portion (4c) other than the specific corner portion (4s) and the facing surface portion (5p).

Here, it is preferable that a length (LG) in the axial direction (L) of a region in which a clearance (G) between the specific corner portion (4s) and the specific facing surface portion (5s) is formed to be larger than a clearance between the other corner portion (4c) and the other facing surface portion (4p), be equal to or more than a length (LJ) in the axial direction (L) of the axial joint region (JR).

Since contraction force from the radial outer side (R2) toward the radial inner side (R1) is generated in the rotor core (2) from the radial outer side (R2) to the melted joint portion (W2), contraction force in a range in the axial direction (L) in which the melted joint portion (W2) is formed can be easily increased. Thus, it is preferable that the clearance (G) between the specific corner portion (4s) and the specific facing surface portion (5s) be expanded so as to include the range in the axial direction (L) in which the melted joint portion (W2) is formed.

It is preferable that a cross-sectional shape of the permanent magnet (4) orthogonal to the axial direction (L) be a rectangular shape, and the permanent magnet (4) be disposed in the rotor core (2) so that an outer peripheral side surface portion (41) that is one surface facing the outer peripheral surface (CP2) of the rotor core (2) among the four side surface portions (4a) extends along the circumferential direction (C), and among the corner portions (4c) formed in a part in which the outer peripheral side surface portion (41), other side surface portions (4a) adjacent to the outer peripheral side surface portion (41), and the end surface portion (4b) intersect, all of the corner portions (4c) that overlap with the axial joint region (JR) when seen in the radial direction be set as the specific corner portion (4s).

With such a configuration, it is possible to make it difficult for the inner wall surface of the magnet insertion hole (5) and the permanent magnet (4) to abut against each other, even when contraction force from the radial outer side (R2) toward the melted joint portion (W2) on the radial inner side (R1) is generated in the rotor core (2). As a result, tensile stress in the rotor core (2) caused by contraction force and reaction force from the permanent magnet (4) is reduced.

It is preferable that a cross-sectional shape of the permanent magnet (4) orthogonal to the axial direction (L) be a rectangular shape, and the permanent magnet (4) be disposed in the rotor core (2) so that a pair of the permanent magnets (4) is disposed in a V-shape such that a distance between the permanent magnets (4) is reduced as the permanent magnets (4) extend toward the radial inner side (R1), and all of the corner portions (4c) that each face a positioning portion (55) formed in the magnet insertion hole (5) and which positions the permanent magnet (4), that overlap with the axial joint region (JR) when seen in the radial direction, and that face the outer peripheral surface (CP2) of the rotor core (2) be set as the specific corner portion (4s).

With such a configuration, in the rotor core (2), it is possible to reduce the spots at with the positioning portion (55) formed in the magnet insertion hole (5) and the permanent magnet (4) abut against each other, even when contraction force from the radial outer side (R2) toward the melted joint portion (W2) on the radial inner side (R1) is generated. Specifically, since the clearance (G) is provided between the positioning portion (55) and the permanent magnet (4) on which a strong contraction force acts, it is possible to make it difficult for the positioning portion (55) and the permanent magnet (4) to abut against each other. As a result, tensile stress in the rotor core (2) caused by the contraction force and reaction force from the permanent magnet (4) is reduced.

It is preferable that one magnetic pole (M) be configured of at least one permanent magnet (4) and a plurality of magnetic poles (M) be arranged along the circumferential direction (C), and the melted joint portion (W2) be formed in a partial region of the inner peripheral surface (CP1) of the rotor core (2) in the circumferential direction (C), and be disposed between two magnetic poles (M) that are adjacent in the circumferential direction (C).

It is preferable that the melted joint portion (W2) be provided between the adjacent magnetic poles (M) so as not to be a resistance of a magnetic path that is a path of a magnetic flux. In contrast, when the melted joint portion (W2) is disposed between the magnetic poles (M), there is an increase in cases in which root parts that are end portions of a so-called bridge portion (BR) in the circumferential direction (C) is positioned at the vicinity of the melted joint portion (W2) when seen in the radial direction. The bridge portion (BR) is a part that is positioned on the radial outer side (R2) of the magnet insertion hole (5) in the rotor core (2) and that has a thin radial width. When contraction force is generated from the radial outer side (R2) to the radial inner side (R1) toward the melted joint portion (W2), a large tensile stress acts on the root parts of the bridge portion (BR) that have a low strength, and partial deformation of the rotor core (2) around the bridge portion (BR) is easily generated. However, by forming the clearance (G) between the specific corner portion (4s) and the specific facing surface portion (5s) such as the clearance (G) described above, it is possible to reduce such a tensile stress. Thus, with such a configuration, it is possible to obtain a suitable rotor for a rotary electric machine by reducing tensile strength while ensuring a magnetic path.

DESCRIPTION OF THE REFERENCE NUMERALS

1: Rotor (rotor for rotary electric machine)
2: Rotor core
3: Electromagnetic steel plate
4: Permanent magnet
4a: Side surface portion
4b: End surface portion
4c: Corner portion
4s: Specific corner portion
4g: Chamfered portion (chamfer)
5: Magnet insertion hole
5p: Facing surface portion
5s: Specific facing surface portion
55: Positioning portion
9: Hub (rotor support member)
C: Circumferential direction
CP1: Inner peripheral surface
CP2: Outer peripheral surface
E: Disposed member
F: Fixing material
G: Buffer clearance (clearance between specific corner portion and specific facing surface portion)
JR: Joint region
L: Axial direction
LG: Length in axial direction of region in which clearance (buffer clearance) is formed
LJ: Length in axial direction of joint region
M: Magnetic pole
R: Radial direction
R1: Radial inner side
R2: Radial outer side
W2: Second joint portion (melted joint portion)

The invention claimed is:

1. A rotor for a rotary electric machine, the rotor provided with a cylindrical rotor core that is configured by stacking electromagnetic steel plates in an axial direction and that has a plurality of magnet insertion holes, and provided with a plurality of permanent magnets that are inserted in the magnet insertion holes, and supported by a rotor support member from a radial inner side, wherein each of the magnet insertion holes is formed to extend in the axial direction, and the magnet insertion holes are arranged along a circumferential direction, each of the permanent magnets has a side surface portion that is a surface along the axial direction, and an end surface portion that is an end surface in the axial direction, and has a plurality of corner portions formed in a part in which the side surface portion and the end surface portion intersect, a melted joint portion is formed on an end portion in the axial direction on an inner peripheral surface of the rotor core, and the rotor core is joined to the rotor support member at the melted joint portion, a region in the axial direction in which the melted joint portion is formed is set as an axial joint region, among the corner portions of the permanent magnet, at least one corner portion that overlaps with the axial joint region when seen in a radial direction and that faces an outer peripheral surface of the rotor core is set as a specific corner portion, parts on an inner wall surface of the magnet insertion hole that face the respective corner portions are set as facing surface portions, and among a plurality of the facing surface portions, the facing surface portion that faces the specific corner portion is set as a specific facing surface portion, and a clearance formed between the specific corner portion and the specific facing surface portion is larger than a clearance formed between another corner portion and another facing surface portion, wherein the clearance is a volume filled exclusively with air.

2. The rotor for a rotary electric machine according to claim 1, wherein the clearance is a space formed between the corner portion and the facing surface portion, and when there is another disposed member between the corner portion and the facing surface portion, the clearance is a space formed in a part excluding the disposed member, between the corner portion and the facing surface portion.

3. The rotor for a rotary electric machine according to claim 2, wherein the disposed member is a fixing material disposed between the inner wall surface of the magnet insertion hole and the permanent magnet to fix the permanent magnet inside the magnet insertion hole.

4. The rotor for a rotary electric machine according to claim 3, wherein a chamfer larger than a chamfer formed in the other corner portion is formed in the specific corner portion of the permanent magnet.

5. The rotor for a rotary electric machine according to claim 3, wherein the specific facing surface portion of the magnet insertion hole is formed so as to be a shape recessed toward a direction away from the permanent magnet compared to the other facing surface portion.

6. The rotor for a rotary electric machine according to claim 3, wherein a length in the axial direction of a region in which a clearance between the specific corner portion and the specific facing surface portion is formed to be larger than a clearance between the other corner portion and the other facing surface portion, is equal to or more than a length in the axial direction of the axial joint region.

7. The rotor for a rotary electric machine according to claim 3, wherein
a cross-sectional shape of the permanent magnet orthogonal to the axial direction is a rectangular shape, and the permanent magnet is disposed in the rotor core so that an outer peripheral side surface portion that is one surface facing the outer peripheral surface of the rotor core among the four side surface portions extends along the circumferential direction, and
among the corner portions formed in a part in which the outer peripheral side surface portion, other side surface portions adjacent to the outer peripheral side surface portion, and the end surface portion intersect, all of the corner portions that overlap with the axial joint region when seen in the radial direction are set as the specific corner portion.

8. The rotor for a rotary electric machine according to claim 3, wherein
a cross-sectional shape of the permanent magnet orthogonal to the axial direction is a rectangular shape, and the permanent magnet is disposed in the rotor core so that a pair of the permanent magnets is disposed in a V-shape such that a distance between the permanent magnets is reduced as the permanent magnets extend toward the radial inner side when seen in the axial direction, and
all of the corner portions that each face a positioning portion formed in the magnet insertion hole and which positions the permanent magnet, that overlap with the axial joint region when seen in the radial direction, and that face the outer peripheral surface of the rotor core are set as the specific corner portion.

9. The rotor for a rotary electric machine according to claim 2, wherein a chamfer larger than a chamfer formed in the other corner portion is formed in the specific corner portion of the permanent magnet.

10. The rotor for a rotary electric machine according to claim 2, wherein the specific facing surface portion of the magnet insertion hole is formed so as to be a shape recessed toward a direction away from the permanent magnet compared to the other facing surface portion.

11. The rotor for a rotary electric machine according to claim 2, wherein a length in the axial direction of a region in which a clearance between the specific corner portion and the specific facing surface portion is formed to be larger than a clearance between the other corner portion and the other facing surface portion, is equal to or more than a length in the axial direction of the axial joint region.

12. The rotor for a rotary electric machine according to claim 2 wherein
a cross-sectional shape of the permanent magnet orthogonal to the axial direction is a rectangular shape, and the permanent magnet is disposed in the rotor core so that an outer peripheral side surface portion that is one surface facing the outer peripheral surface of the rotor core among the four side surface portions extends along the circumferential direction, and
among the corner portions formed in a part in which the outer peripheral side surface portion, other side surface portions adjacent to the outer peripheral side surface portion, and the end surface portion intersect, all of the corner portions that overlap with the axial joint region when seen in the radial direction are set as the specific corner portion.

13. The rotor for a rotary electric machine according to claim 2, wherein
a cross-sectional shape of the permanent magnet orthogonal to the axial direction is a rectangular shape, and the permanent magnet is disposed in the rotor core so that a pair of the permanent magnets is disposed in a V-shape such that a distance between the permanent magnets is reduced as the permanent magnets extend toward the radial inner side when seen in the axial direction, and
all of the corner portions that each face a positioning portion formed in the magnet insertion hole and which positions the permanent magnet, that overlap with the axial joint region when seen in the radial direction, and that face the outer peripheral surface of the rotor core are set as the specific corner portion.

14. The rotor for a rotary electric machine according to claim 2, wherein one magnetic pole is configured of at least one permanent magnet and a plurality of magnetic poles are arranged along the circumferential direction, and
the melted joint portion is formed in a partial region of the inner peripheral surface of the rotor core in the circumferential direction, and is disposed between two magnetic poles that are adjacent in the circumferential direction.

15. The rotor for a rotary electric machine according to claim 1, wherein a chamfer larger than a chamfer formed in the other corner portion is formed in the specific corner portion of the permanent magnet.

16. The rotor for a rotary electric machine according to claim 1, wherein the specific facing surface portion of the magnet insertion hole is formed so as to be a shape recessed toward a direction away from the permanent magnet compared to the other facing surface portion.

17. The rotor for a rotary electric machine according to claim 1, wherein a length in the axial direction of a region in which a clearance between the specific corner portion and the specific facing surface portion is formed to be larger than a clearance between the other corner portion and the other facing surface portion, is equal to or more than a length in the axial direction of the axial joint region.

18. The rotor for a rotary electric machine according to claim 1, wherein
a cross-sectional shape of the permanent magnet orthogonal to the axial direction is a rectangular shape, and the permanent magnet is disposed in the rotor core so that an outer peripheral side surface portion that is one surface facing the outer peripheral surface of the rotor core among the four side surface portions extends along the circumferential direction, and
among the corner portions formed in a part in which the outer peripheral side surface portion, other side surface portions adjacent to the outer peripheral side surface portion, and the end surface portion intersect, all of the corner portions that overlap with the axial joint region when seen in the radial direction are set as the specific corner portion.

19. The rotor for a rotary electric machine according to claim 1, wherein a cross-sectional shape of the permanent magnet orthogonal to the axial direction is a rectangular shape, and the permanent magnet is disposed in the rotor core so that a pair of the permanent magnets is disposed in a V-shape such that a distance between the permanent magnets is reduced as the permanent magnets extend toward the radial inner side when seen in the axial direction, and all of the corner portions that each face a positioning portion formed in the magnet insertion hole and which positions the permanent magnet, that overlap with the axial joint region when seen in the radial direction, and that face the outer peripheral surface of the rotor core are set as the specific corner portion.

20. The rotor for a rotary electric machine according to claim 1, wherein one magnetic pole is configured of at least one permanent magnet and a plurality of magnetic poles are arranged along the circumferential direction, and the melted joint portion is formed in a partial region of the inner peripheral surface of the rotor core in the circumferential direction, and is disposed between two magnetic poles that are adjacent in the circumferential direction.

* * * * *